United States Patent [19]
Moore

[11] 3,722,815
[45] Mar. 27, 1973

[54] FOG ABATEMENT WITH POLYHYDRIC ORGANIC COMPOUNDS

[75] Inventor: Zack J. Moore, Lake Jackson, Tex.

[73] Assignee: The Dow Chemical Company, Midland, Mich.

[22] Filed: May 24, 1971

[21] Appl. No.: 146,557

[52] U.S. Cl....................239/2 R, 252/305, 252/325
[51] Int. Cl.....A01g 15/00, E01h 13/00, B01d 17/00
[58] Field of Search.........239/2 R, 14; 252/305, 319, 252/325; 47/2

[56] References Cited

UNITED STATES PATENTS

| | | | |
|---|---|---|---|
| 3,584,412 | 6/1971 | Palmer | 239/318 |
| 3,654,175 | 4/1972 | Henderson | 47/2 |
| 2,962,450 | 11/1960 | Elod | 239/14 X |
| 3,595,477 | 7/1971 | Wollin | 239/2 R |
| 3,608,810 | 9/1971 | Kooser | 239/2 R |
| 2,232,728 | 2/1941 | Pleasants | 252/319 X |

Primary Examiner—Robert S. Ward, Jr.
Attorney—Griswold & Burdick, Raymond B. Ledlie and B. G. Colley

[57] ABSTRACT

Method for fog and cloud abatement wherein a normally liquid polyhydric aliphatic organic compound containing 2 to about 26 carbon atoms such as glycerine is dispersed into the fog in a particle size range from about 10 to about 100 microns.

5 Claims, No Drawings

FOG ABATEMENT WITH POLYHYDRIC ORGANIC COMPOUNDS

BACKGROUND OF THE INVENTION

This invention relates to the abatement or dispersal of both natural and artifically formed fogs and clouds, by introducing micron sized particles of a normally liquid polyhydric organic compound into the fogs and clouds.

Warm air fogs, i.e. those forming in the ambient atmosphere above 0°C, have long been a problem around airports and the like since they cause accidents and time delays that cost millions of dollars annually. It is one of the objects of this invention to provide a method for the dispersion of such warm air fogs.

It has been reported from U.S. Pat. No. 2,908,442 that fogs and the like can be dispersed by the introduction of lower alkyl alcohols.

It is also known from U.S. Pat. No. 3,534,906 that fogs and the like can be dispersed by the introduction of polyelectrolytes in fine particle form.

Unfortunately, these prior methods do not give consistent or reproducible results when tested in natural or synthetic fogs.

SUMMARY OF THE INVENTION

This invention comprises a method of producing precipitation by accretion of particles suspended in natural and artificial clouds and fogs, wherein a normally liquid polyhydric aliphatic organic compound having a carbon range from two to about 26 carbons or mixtures thereof and having a particle size in the range from about 10 to about 100 microns are dispersed into the clouds and fogs in an amount sufficient to produce precipitation or condensation of said suspended particles.

More limited aspects of the present invention are the use of hydroxy terminated ethers or alkane polyols having two or more hydroxyl groups as the liquid polyhydric aliphatic organic compound.

It is within the purview of this invention to use a single compound meeting the above requirements or a mixture of one or more of the above compounds.

DETAILED DESCRIPTION

In the practice of this invention the organic compounds are either carried aloft and disseminated by airplanes or blown upwardly by large fans located in strategic positions on the ground.

It is essential that the organic compounds be dispersed into droplets in the range from about 10 to about 100 microns by centrifugal atomizers, sonic agitation, pneumatic and/or hydraulic atomizers.

The amount of organic compound or the rate of application that is required to produce the desired abatement is a variable factor depending upon the existing metrological conditions. Obviously, a dense fog will require more material than a light fog. Those skilled in the art can readily determine the amount required.

Examples of the normally liquid polyhydric aliphatic organic compounds which can be used in this process are:

a. hydroxy terminated ethers such as diethylene glycol, triethylene glycol, tetraethylene glycol, dipropylene glycol, tripropylene glycol and polyoxyethylene glycols having an average molecular weight of 200 - 600, and a carbon range from about eight to about 26 carbons.

b. alkane polyols such as ethylene glycol, propylene glycol, glycerin, 1, 3 propane diol, 1, 4-butane diol, 1, 3-butane diol, and 1, 2, 4-butane triol.

The foregoing compounds are hydrophilic organic compounds and apparently cause a dissipation of the fog or cloud by reason of the fact that in falling through the dispersed water droplets they collide and coalesce with the same. Thus, after falling through the fog bank, the originally introduced small droplets of polyhydric organic compounds become progressively larger by an accretion process and finally fall as a gentle rain which is ecologically acceptable since the compounds are non-corrosive and biologically inactive.

The following examples are presented to further illustrate and not limit the above described invention:

EXAMPLES 1 – 14

A fog chamber is constructed of a closed two foot diameter stainless steel cylinder, three feet long mounted in an upright position. An optical transmissometer is mounted in the fog chamber to provide a horizontal light beam through the center of the chamber. Light extinction is measured and recorded as a function of time.

The bottom of the chamber is covered with water to one half an inch and the air contained therein is allowed to approach saturation (100 percent relative humidity).

A water fog is introduced into the chamber by a high frequency sonic generator. The quantity of the fog is controlled by the level of sonic energy and the length of the generation period.

The natural dissipation rate of this fog, i.e., the control or standard is recorded as a function of optical extinction versus time.

After the natural dissipation rate is obtained, the fog is again generated and when the fog is dissipated to 20 percent transmission, a quantity of the compound to be tested is atomized into the chamber with a spinning disc centrifuge located on the top of the chamber. Any change in the dissipation rate between the treated and untreated control fog is noted. The difference in percent transmission obtained between the control and the treated fog is expressed as a percent of the difference between the control and 100 percent dissipation and is reported in the following table:

TABLE

| Examples | | Quan. added | Percent dissipation 50 sec. after addition | 75 sec. after addition |
|---|---|---|---|---|
| control 1: | anhydrous sodium chloride (0-44) micron particle size | 1 mg | 100% | |
| control 2: | water | 0.5 ml | 0 | 0 |
| control 3: | ethyl alcohol | 0.5 | 0 | |
| 1 | ethylene glycol | 0.5 | 50% | |
| 2 | diethylene glycol | 0.5 | 90% | |
| 3 | triethylene glycol | 0.5 | 100% | |
| 4 | tetraethylene glycol | 0.5 | 100% | |
| 5 | E-200* | 0.5 | 90% | |
| 6 | E-300* | 0.5 | 40% | |
| 7 | E-400* | 0.5 | 40% | |
| 8 | E-600* | 0.5 | 35% | |
| 9 | 1,4-butane diol | 0.5 | 39% | |
| 10 | propylene glycol | 0.5 | 30% | |

| | | | | |
|---|---|---|---|---|
| 11 | dipropylene glycol | 0.5 | 77% | |
| 12 | tripropylene glycol | 0.5 | 88% | |
| 13 | glycerine | 0.5 | 100% | |
| 14 | glycerine | 0.5 | | 100% |
| Control 4: | dimethyl formamide | 1.0 | | 0% |
| control 5: | triethanolamine | 0.5 | | 80% |
| control 6: | tetraethylene pentamine | 0.5 | | 72% |
| control 7: | polyethylenimine (aver.mol.wt.300) | 0.5 | | 17% |

*Commercially available polyethylene glycols having an average molecular weight corresponding to the E number and having the generic formula $HO(C_2H_4O)nC_2H_4OH$ where n varies from about 3 to about 12.

The foregoing table shows that other fog dispersants such as sodium chloride and various organic amines and amides are sometimes effective to disperse fogs, however, these materials are disadvantageous in that they are ecologically not acceptable since they are either corrosive to metals or toxic to flora and fauna.

EXAMPLE 15

Rain was made to fall from a natural fog in the following manner:

At a small airport on the Gulf Coast of the United States at 6:00 a.m. on a foggy February morning an experiment was conducted. The wind speed was approximately 6–8 miles per hour from the east. The air temperature was about 60° F. Glycerine was atomized into 10–100 micron diameter droplets using a centrifugal atomizer at a rate of approximately 0.75 gal./min. and air lifted to a height of approximately 75–100 ft. with the aid of a large volume high velocity (approx. 4,000 cubic ft./min.) fan. The seeding period lasted 15 minutes. It was noted by two observers that a light rain was very much in evidence down-wind from the seeding apparatus. The observations were made in the following manner: (a) by a Tyndall light beam, (b) walking through the path of the rain and observing the fallout, (c) driving an automobile through the path of the fallout and observing raindrops on the windshield.

EXAMPLE 16:

A warm fog was again dispersed from the same small airport used in Example 15 in the following manner:

At 6:45 a.m. on a foggy March day, glycerine was atomized into 10–100 micron diameter droplets at a rate of 0.5 gal./min. with a centrifugal atomizer and air lifted to a height of 75–100 ft. with the aid of a large volume high velocity vertically-mounted fan. The wind speed was approximately 3–6 miles per hour from the east southeast, the air temperature was about 45° F. The seeding period lasted for approximately 5 minutes and was terminated at 6:50 a.m. The following observations were confirmed by five witnesses:

1. Runway lights located approximately 800 feet downwind became clearly visible in the affected area within a period of 3–4 minutes. Lights on either side of the affected area remained obscured in the fog.
2. Fence posts located on the western boundry of the airpot (approximately 950 feet downwind) became clearly visible in the affected area (a total of 21 could be counted). The posts located on either side of the affected area remained obscured in the fog.
3. Two transmissometers with approximately 25–50 percent of the sample beam extending into the affected area responded upscale— indicating an improvement in visibility i.e., better transmission.

At 6:50 a.m. seeding was discontinued. Visibility in the cleared area downwind from the seeding apparatus dropped to less than 500 feet within a period of 2–3 minutes. The transmissometers responded downscale — indicating near zero visibility.

At 7:05 a.m. seeding was again resumed using the same experimental conditions outlined in the 6:45 a.m. experiment. The resultant effects were identical to those described in the 6:45 a.m. experiment. It was also observed that a substantially large droplet fall-out (rain) occured over a large area starting at approximately 400 ft. downwind from the seeding apparatus. A microscopic examination of the fall-out revealed a particle size range from approximately 10 microns to 1 mm diameter.

I claim:

1. A method of producing precipitation by accretion of particles suspended in natural and artificial clouds and fogs, comprising dispersing into said clouds and fogs a liquid consisting essentially of a normally liquid polyhydric aliphatic organic compound having a carbon range from 2 to about 26 or mixtures thereof, and having a particle size in the range from about 10 to about 100 microns in an amount sufficient to produce precipitation of said suspended particles.

2. The method of claim 1 wherein the polyhydric organic compounds are hydroxy terminated ethers.

3. The method of claim 2 wherein the hydroxy terminated ethers are selected from the group consisting of diethylene glycol, triethylene glycol and tetraethylene glycol.

4. The method of Claim 1 wherein the polyhydric organic compounds are alkane polyols.

5. The method of Claim 4 wherein the alkane polyol is glycerine.

* * * * *